United States Patent
Schwarz et al.

(10) Patent No.: US 7,526,289 B2
(45) Date of Patent: Apr. 28, 2009

(54) RADIO RESOURCE CONTROL METHOD IN MOBILE COMMUNICATION SYSTEM, MOBILE COMMUNICATION SYSTEM AND NETWORK ELEMENT

(75) Inventors: Uwe Schwarz, Veikkola (FI); Petteri Hakalin, Malaga (ES); Antti Tölli, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/529,559

(22) PCT Filed: Oct. 23, 2002

(86) PCT No.: PCT/FI02/00824

§ 371 (c)(1),
(2), (4) Date: Mar. 29, 2005

(87) PCT Pub. No.: WO2004/040935

PCT Pub. Date: May 13, 2004

(65) Prior Publication Data
US 2006/0111110 A1 May 25, 2006

(51) Int. Cl.
*H04W 36/00* (2006.01)
(52) U.S. Cl. .................. 455/439; 455/512; 370/332
(58) Field of Classification Search ............... 455/67.1, 455/67.3, 422.1, 436, 512, 437, 532, 438, 455/439, 450, 522; 370/331, 332
See application file for complete search history.

(56) References Cited

U.S. PATENT DOCUMENTS

| | | | | |
|---|---|---|---|---|
| 5,946,621 A | * | 8/1999 | Chheda et al. | 455/440 |
| 6,134,440 A | * | 10/2000 | Black | 455/436 |
| 6,181,943 B1 | * | 1/2001 | Kuo et al. | 455/437 |
| 6,434,389 B1 | * | 8/2002 | Meskanen et al. | 455/437 |
| 6,456,858 B1 | | 9/2002 | Streter | |
| 2002/0107019 A1 | * | 8/2002 | Mikola et al. | 455/436 |
| 2002/0173275 A1 | * | 11/2002 | Coutant | 455/67.1 |
| 2002/0187780 A1 | * | 12/2002 | Souissi | 455/426 |
| 2003/0045241 A1 | * | 3/2003 | Noerpel et al. | 455/67.1 |
| 2004/0102194 A1 | * | 5/2004 | Naghian et al. | 455/436 |
| 2004/0116110 A1 | * | 6/2004 | Amerga et al. | 455/422.1 |
| 2004/0147262 A1 | * | 7/2004 | Lescuyer et al. | 455/434 |

FOREIGN PATENT DOCUMENTS

| | | |
|---|---|---|
| WO | WO 99/09777 | 2/1999 |
| WO | 2 331 892 A | 6/1999 |
| WO | WO 02/09464 | 1/2002 |

* cited by examiner

*Primary Examiner*—Quochien B Vuong
(74) *Attorney, Agent, or Firm*—Squire, Sanders & Dempsey, LLP

(57) ABSTRACT

The invention relates to a radio resource control method, a mobile communications system and a network element implementing the method. According to the invention, the cell change procedures performed by the user equipment in an idle state are controlled dynamically with control information that is adjusted according to a predetermined time pattern. The invention enables for instance an advanced cell change in an idle state, thus reducing the probability of a handover while the user equipment is in a dedicated connection to the network.

42 Claims, 7 Drawing Sheets

RADIO RESOURCE CONTROL METHOD IN MOBILE COMMUNICATION SYSTEM, MOBILE COMMUNICATION SYSTEM AND NETWORK ELEMENT

FIELD

The invention relates to a radio resource control method in a mobile communication system, to a mobile communication system, and to a network element.

BACKGROUND

As the need for transferring large amounts of information, such as data associated with video and audio signals, over wireless communication systems has increased, handover procedures where user equipment moves from a cell to another may introduce a significant decrease in the effective capacity of the system. This is especially the case when the handover occurs between cells with different radio interfaces. The difference between the radio interfaces may be due to different carrier frequencies or different radio access technologies between the cells participating the handover.

The handover may occur in different states of the radio resource control. Such states include a connected state in which the user equipment is allocated a dedicated channel, and an idle state in which the user equipment is not allocated a dedicated connection. Common channels, such as common pilot channels and common broadcast channels, are in turn used in idle states.

In an idle state, the user equipment is capable of carrying out cell change procedures aimed at selecting a cell which the user equipment can camp on after leaving the serving cell. The cell change procedures are controlled by the network using control information for the cell change procedures. The control information associated with the cell change in an idle state is broadcast to the user equipment via control channels of the radio system.

According to prior art solutions, the control information associated with the cell change procedures is typically based on field measurements, and the control information is fed in the system during the network set-up. The prior art solutions can lead to a situation, where the user equipment camps on a cell with a limited optimisation level, thus increasing the probability for handover during a dedicated connection and data transfer. As a result, the capacity of the radio system is decreased due to simultaneous signalling and data transfer.

BRIEF DESCRIPTION OF THE INVENTION

It is an object of the invention to provide a method and a mobile communication system in such a way that the cell change procedures can be controlled dynamically while the user equipment is in an idle state. This is achieved by a radio resource control method in a mobile communication system comprising a serving cell formed by a serving base station, at least one neighbour cell formed by a neighbour base station, and user equipment capable of receiving signals from said base stations, the method comprising the steps of: camping, in an idle state, on the serving cell; receiving, in the user equipment, control information for controlling cell change procedures of the user equipment, said cell change being conducted from the serving cell to a target cell; and performing, in the user equipment, the cell change procedures based on the received control information. In a method according to the invention, at least one element of said control information is adjusted, before the control information is received, according to a predetermined time pattern, thus forming adjusted control information; and the cell change procedures are controlled based on said adjusted control information.

The invention also relates to a network element of a mobile communication system, which comprises: a serving base station for forming a serving cell; a neighbour base station for forming a neighbour cell; and a user equipment camped on the serving cell in an idle state and comprising receiving means for receiving signals from the serving base station and from the neighbour base station, the user equipment further comprising cell change procedure means for performing cell change procedures based on control information; and control means for controlling cell change procedures with control information, said cell change being conducted from the serving cell to a target cell, the network element comprising adjusting means for adjusting at least one element of said control information according to a predetermined time pattern, thus forming adjusted control information.

Preferred embodiments of the invention are described in the dependent claims.

The method, system and network element of the invention provide several advantages. In a preferred embodiment of the invention, the cell change procedure can be controlled such that the probability of a cell change is lowered while the user equipment is in a dedicated connection, thus reducing mobile measurements and signalling during a dedicated connection and increasing the overall capacity of the mobile communication system.

LIST OF THE DRAWINGS

In the following, the invention will be described in greater detail with reference to the preferred embodiments and the accompanying drawings, in which FIG. 1 shows a simplified structure of a mobile communication system by means of a block diagram;

DESCRIPTION OF THE EMBODIMENTS

The invention can thus be applied to a mobile communication system comprising more than one radio access technology to which the user equipment can be connected. The radio access technologies that can be used include: GSM (Global System for Mobile Communications), GERAN (GSM/EDGE Radio access network), GPRS (General Packet Radio Service), E-GPRS (EDGE GPRS), UMTS (Universal Mobile Telecommunications System), CDMA2000 (CDMA, Code Division Multiple Access), US-TDMA (US Time Division Multiple Access), Bluetooth-based short-range systems and WLAN (Wireless Local Area Network). Below, preferred embodiments will be described using two radio systems, i.e.

the GSM and UMTS, as examples, without limiting the invention to these systems, as will be obvious to a person skilled in the art.

Figure 1:
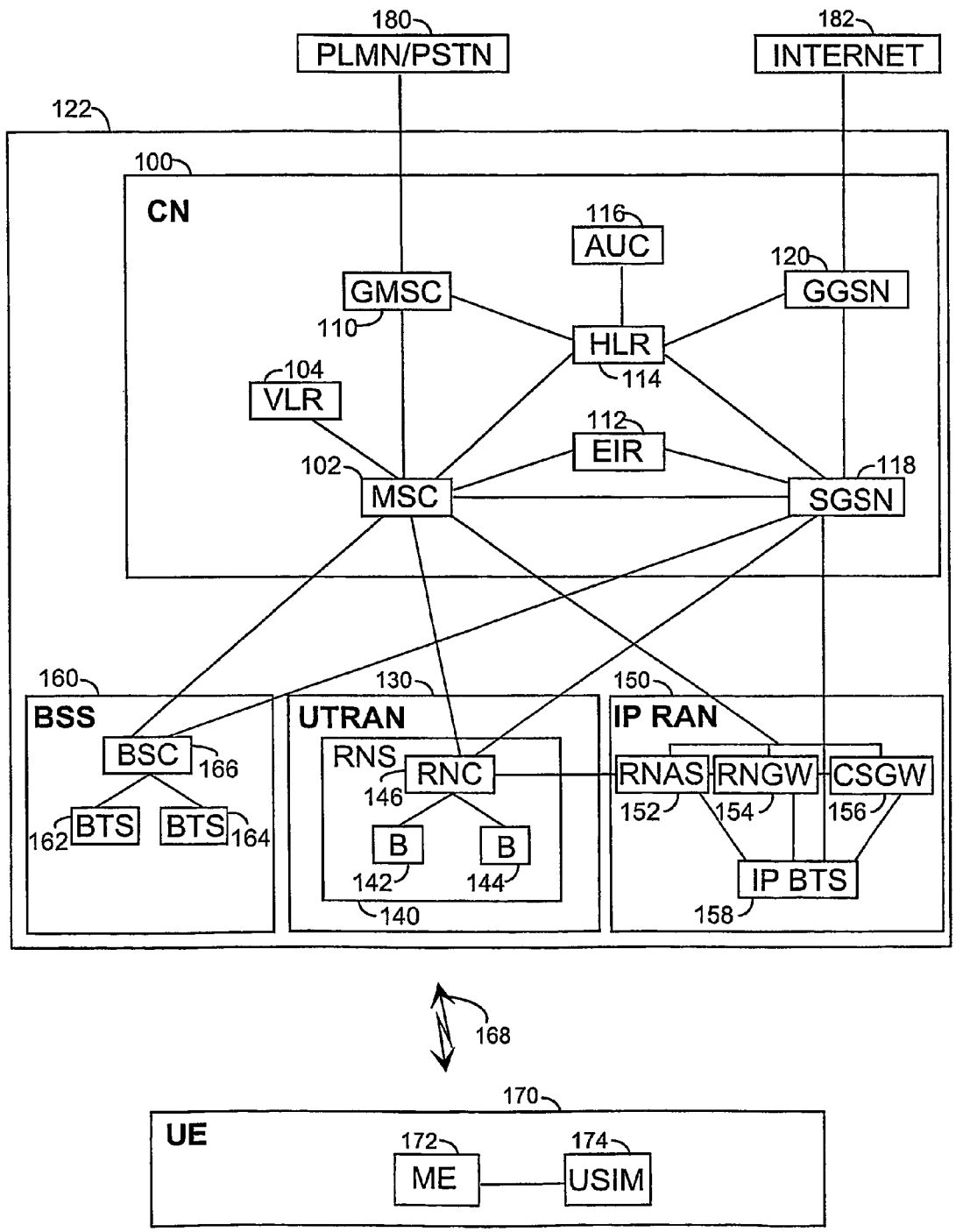

With reference to FIG. 1, let us examine an example of a mobile communication system to which the preferred embodiments of the invention can be applied. FIG. 1 is a simplified block diagram which illustrates the most important parts of mobile communication systems at network element level. The structure and the functions of the network elements are only described when relevant to the invention.

The main parts of a mobile communication system are a core network (CN) 100, a radio access network 130 and user equipment (UE) 170. The user equipment 170 has a radio interface 168 with the core network 100. A radio access network (RAN) called UTRAN (UMTS Terrestrial Radio Access Network) 130 belongs to the third generation and is implemented by wideband code division multiple access (WCDMA) technology. FIG. 1 also shows a base station system 160 implemented by time division multiple access (TDMA) technology, and an Internet Protocol Radio Access Network 150 (IP RAN) implemented with WCDMA technology.

On a general level, the mobile communication system can also be defined to comprise user equipment 170 and a network part 122. The user equipment 170 is also called a terminal, a mobile station, a subscriber terminal and a mobile telephone. The network part 122 comprises the fixed infrastructure of the radio system, i.e. the core network 100, the radio access network 130 and the base station system 160. In this context, the radio access network 130, the base station system 160, the Internet protocol radio access system 150, and related systems will be called a radio access network. Furthermore, for the sake of simplicity, the core network 100 is shown in terms of 2G network elements.

The structure of the core network 100 corresponds to a combined structure of the GSM and GPRS systems. The GSM network elements are responsible for establishing circuit-switched connections, and the GPRS network elements are responsible for establishing packet-switched connections; some of the network elements are, however, included in both systems.

A mobile services switching centre (MSC) 102, or an MSC server (MSS), is the centre point of the circuit-switched side of the core network 100. The same mobile services switching centre 102 can be used to serve the connections of the radio access network 130, the base station system 160, and the Internet protocol radio access system 150. The tasks of the mobile services switching centre 102 include: switching, paging, user equipment location registration, handover management, collection of subscriber billing information, encryption parameter management, and echo cancellation.

The number of mobile services switching centres 102 may vary: a small network operator may only have one mobile services switching centre 102 but large core networks 100 may have several ones. Large core networks 100 may have a separate gateway mobile services switching centre (GMSC) 110, which is responsible for circuit-switched connections between the core network 100 and external networks 180. The gateway mobile services switching centre 110 is located between the mobile services switching centre 102 and the external networks 180. An external network 180 can be for instance a public land mobile network (PLMN) or a public switched telephone network (PSTN). The public land mobile network (PLMN) 180 is a public provider of mobile communication services, usually maintained and managed by administrative authorities or a recognized private operating agency (RPOA). For the sake of simplicity, the administrative authority or RPOA operating PLMN is called a network operator or an operator. PLMN may rely on several radio access technologies, e.g. UTRA, GSM, and the Internet protocol radio access based technologies.

A home location register (HLR) 114 comprises a permanent subscriber register, i.e. the following information, for instance: an international mobile subscriber identity (IMSI), a mobile subscriber ISDN number (MSISDN), an authentication key, and when the radio system supports GPRS, a packet data protocol (PDP) address.

A visitor location register (VLR) 104 contains roaming information on user equipment 170 in the area of the mobile services switching centre 102. The visitor location register 104 comprises almost the same information as the home location register 114, but in the visitor location register 104, the information is kept only temporarily. The visitor location register 104 comprises information needed for processing calls placed or received by user equipment 170 registered in a database of the visitor location register 104. The visitor location register 104 may also receive the necessary additional information from the home location register 114. The visitor location register 104 comprises the following information, for example: an international mobile subscriber identity (IMSI), a mobile subscriber ISDN number (MSISDN), user equipment roaming number (MSRN) and the location area (LA) of a user equipment.

An equipment identity register (EIR) 112 comprises the international mobile equipment identities (IMEI) of the user equipment 170 used in the radio system, and a so-called white list, and possibly a black list and a grey list.

An authentication centre (AuC) 116 is always physically located in the same place as the home location register 114, and it comprises a subscriber authentication key and a corresponding IMSI.

The network elements shown in FIG. 1 are functional entities whose physical implementation may vary. Usually, the mobile services switching centre 102 and the visitor location register 104 constitute one physical device while the home location register 114, equipment identity register 112 and the authentication centre 116 constitute another physical device.

A serving GPRS support node (SGSN) 118 is the centre point of the packet-switched side of the core network 100. The main task of the serving GPRS support node 118 is to transmit and receive packets together with the user equipment 170 supporting packet-switched transmission by using the radio access network 130, the base station system 160, or the Internet protocol radio access system 150. The serving GPRS support node 118 contains subscriber and location information related to the user equipment 170.

A gateway GPRS support node (GGSN) 120 is the packet-switched side counterpart to the gateway mobile services switching centre 110 of the circuit-switched side with the exception, however, that the gateway GPRS support node 120 must also be capable of routing traffic from the core network 100 to external networks 182, whereas the gateway mobile services switching centre 110 only routes incoming traffic. In our example, the external networks 182 are represented by the Internet.

The base station system 160 comprises a base station controller (BSC) 166 and base transceiver stations (BTS) 162, 164. The base station controller 166 controls the base transceiver station 162, 164. In principle, the aim is that the devices implementing the radio path and their functions reside in the base transceiver station 162, 164 while control devices reside in the base station controller 166.

The base station controller 166 is responsible for the following asks, for instance: radio resource management of the base transceiver station 162, 164, inter-cell handovers, frequency control, i.e. frequency allocation to the base transceiver stations 162, 164, management of frequency hopping sequences, time delay measurement on the uplink, implementation of the operation and maintenance interface, and power control. The radio resource management includes e.g. the cell change procedures.

The base transceiver station 162, 164 comprises at least one transceiver which implements one carrier, i.e. eight time slots, i.e. eight physical channels. Typically, one base transceiver station 162, 164 serves one cell, but a solution is also possible wherein one base transceiver station 162, 164 serves several sectored cells. The tasks of the base transceiver station 162, 164 include, for example: calculation of timing advance (TA), uplink measurements, channel coding, encryption, decryption, and frequency hopping.

The radio access network 130 comprises radio network subsystems 140. Each radio network subsystem 140 comprises radio network controllers (RNC) 146 and nodes B 142, 144. Node B is a rather abstract concept; the term 'base transceiver station' is often used instead.

Operationally, the radio network controller 146 corresponds approximately to the base station controller 166 of the GSM system, and node B 142, 144 corresponds approximately to the base transceiver station 162, 164 of the GSM system. Solutions also exist in which the same device is both the base transceiver station and node B, i.e. the device is capable of implementing both the TDMA and WCDMA radio interfaces simultaneously.

The Internet Protocol Radio Access Network 150 comprises at least one Internet protocol base station (IP BTS) 158. The Internet Protocol Radio Access Network 150 also comprises a circuit-switched gateway (CSGW) 156, RAN gateway (RNGW) 154, and RAN access server (RNAS) 152. The circuit-switched gateway 156 is a logical element used between the Internet Protocol Radio Access Network 150 and the circuit-switched network elements of the core network 100. The circuit-switched gateway 156 is controlled by the RAN access server 152. The RAN access server 152 acts as a signalling gateway between the Internet Protocol Radio Access Network 150 and the core network 100. The RAN gateway 154 is the Internet protocol user plane from the core network 100 or other radio access network 130 to the Internet Protocol Radio Access Network 150. The internet protocol base station 158 can be viewed as a small RNC/BTC connected to the RAN access server 152 and the gateways 154, 156. In the Internet Protocol Radio Access Network 150, most of the functions of the centralised controllers, such as radio network controller 146 and the base station controller 166, are moved to the IP base station 158.

In this context, the node B 142, 144, base transceiver stations 162, 164 and the Internet protocol base station 158, and the corresponding network elements of other relevant radio systems will be called a base station unless otherwise indicated. Furthermore, the network controller 146, the base station controller 166 and other elements performing similar tasks will be called a base station controller unless otherwise indicated. The network controller can be located in the base station that the network controller controls.

The user equipment 170 comprises two parts: mobile equipment (ME) 172 and a UMTS subscriber identity module (USIM) 174. In an embodiment, the user equipment 170 comprises an identity module 174 for each radio system, to which the user equipment 170 can be connected. The user equipment 170 comprises at least one transceiver for establishing a radio link to the radio access network 130 or base station system 160. The user equipment 170 further comprises an antenna, a user interface and a battery.

USIM 174 comprises user-related information and information related to information security in particular, for instance, an encryption algorithm.

Figure 2:
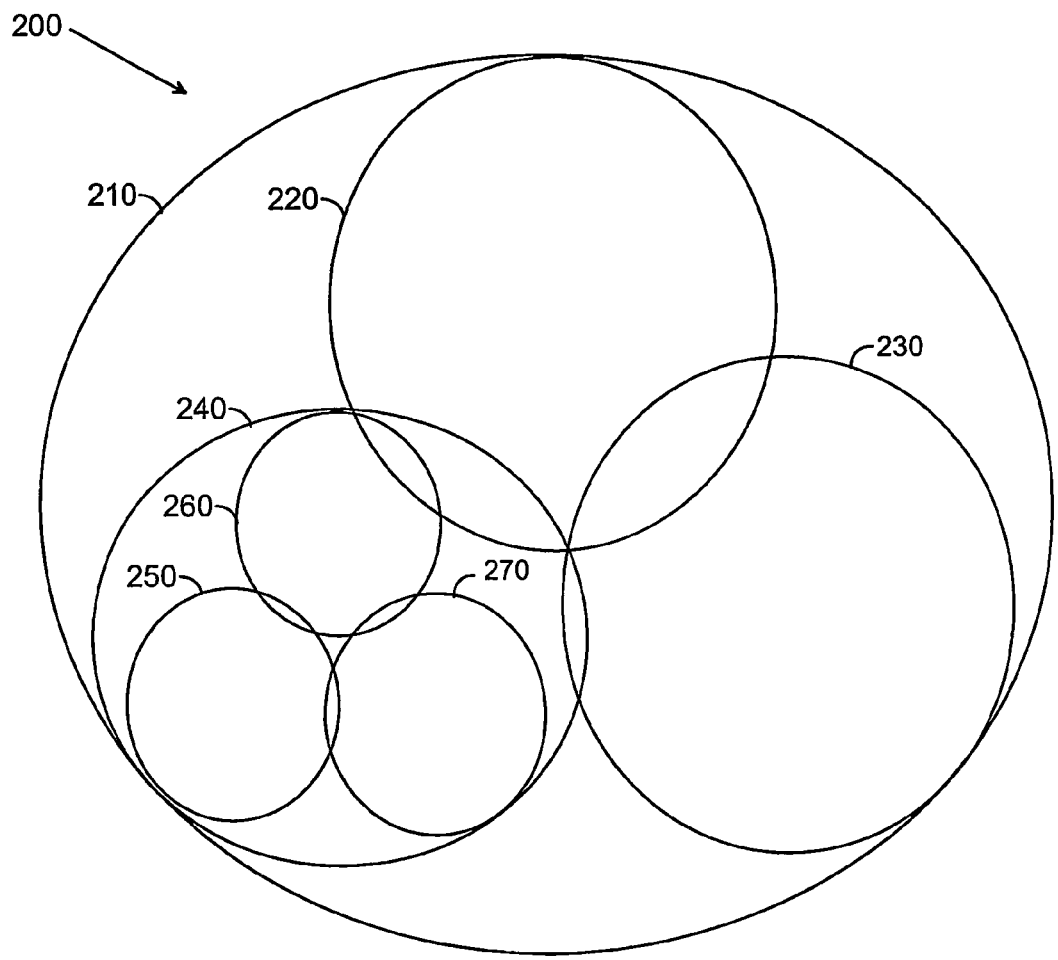
FIG. 2 illustrates an example of a cell structure.

The mobile communication systems according to the invention can be designed using hierarchical cell structures (HCS) or non-hierarchical cell structures (non-HCS). An example of a hierarchical cell structure 200 is shown in FIG. 2. The hierarchical cell structure 200 consists of at least two cells 210, 220, 230, 240, 250, 260, and 270, which can be prioritised with different priorities. The prioritising is included in the prioritising information that can be delivered to the user equipment 170 in system information, for example. In general, the cell prioritisation is a means of encouraging the user equipment 170 to select some suitable cells in preference to others. Operators may prefer a certain type of cell not to be selected unless if it is the only suitable type. For example, umbrella cells 210 can be preferred due to their large frequency reuse distance. Micro-cells 220, 230, 240, or pico-cells 250, 260, 270 can be preferred due to their high capacity. Different cells 210 to 270 can be created using different frequencies. However, different frequencies can also be used in the cells of the same hierarchical level in order to cope with a high load in the system, for example.

In a non-hierarchical cell structure, the priorities between the cells are irrelevant. In general, a non-hierarchical cell structure may consist of cells of different radio access networks, cells of networks of different PLMNs, and cells of different radio systems. In the present context, only the cells are relevant that the user equipment 170 can be connected to.

Figure 3:
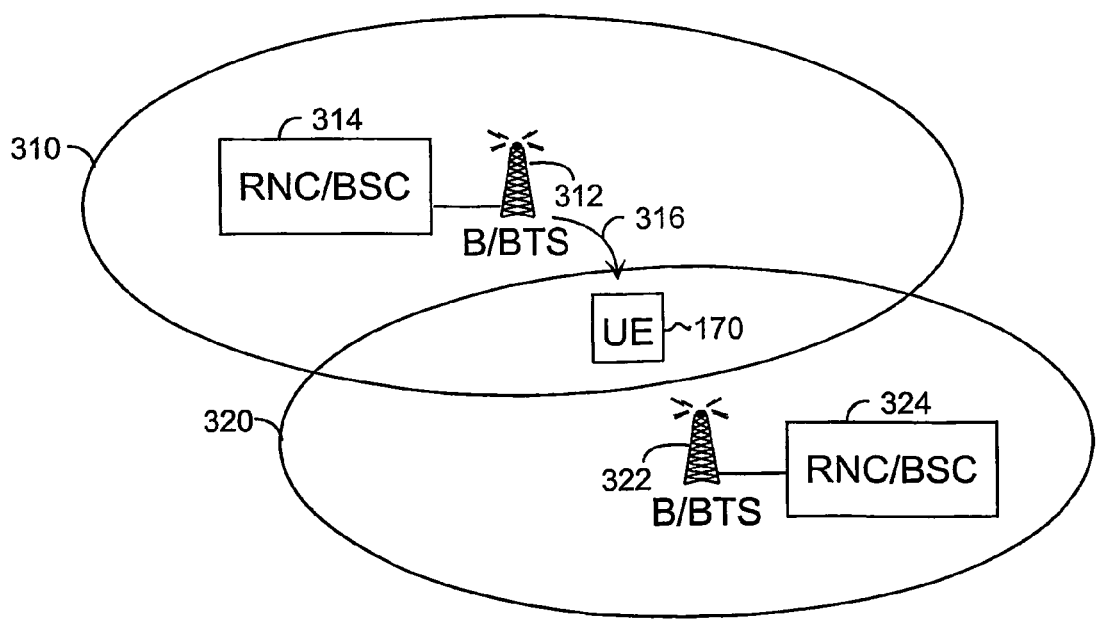
FIG. 3 illustrates an example of a cell structure.

With reference to FIG. 3, let us consider a simplified mobile communication system, the network part 122 of which comprises a serving base station 312 controlled by a serving base station controller 314. The serving base station 312 forms a serving cell 310, which the user equipment 170 has camped on. Furthermore, the network part 122 comprises a neighbour base station 322 controlled by a neighbour base station controller 324. The neighbour base station forms a neighbour cell 320. The network elements shown in FIG. 3 correspond those shown in FIG. 1. The user equipment 170 is configured to receive signals from both the serving base station 312 and from the neighbour base station. Also, the carriers of the neighbour cell 320 can be listed in the neighbour list of the user equipment 170. The user equipment 170 is configured to receive control information 316 for controlling the cell change from the serving base station 312. The serving cell 310 and at least one neighbour cell 320 constitute a group of cells from which a new serving cell, called a target cell, is selected in the cell change procedure based on the received control information.

When camped on a cell, the user equipment 170 has completed a cell change process and has chosen a cell from which it plans to receive services. When camped on the cell, the user equipment 170 receives control information from the serving cell 310 for controlling the cell change procedures of the user equipment 170. Receiving the control information includes the selecting and monitoring of paging channels, such as PICH (page indicator channel) and PCH (paging channel) broadcast in the serving cell 310; monitoring relevant system information and cell broadcast messages including the control information for controlling the cell change procedures. The system information can also indicate whether a hierarchical of non-hierarchical cell structure is used. When camped on the cell, the user equipment 170 is capable of performing measurements on the surrounding cells on the purpose of carrying out the cell change procedures.

Figure 4:
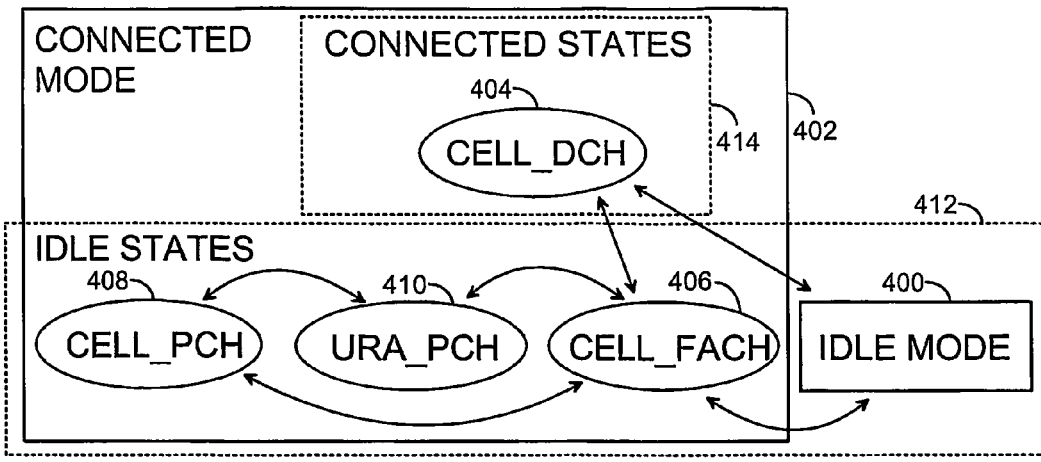
FIG. 4 illustrates different states of the radio resource control.

With reference to FIG. 4, let us consider different states of radio resource control (RRC) of the user equipment 170 and the associated transitions between the different states. The main states of the radio resource control are idle states 412 and connected states 414.

In the idle states 412, the user equipment 170 has neither radio connection nor logical connection to the network part 122. However, the user equipment 170 is capable of receiving control information, such as system information and cell broadcast messages, from the serving cell 310. The system information comprises elements, such as quality thresholds, quality offsets, temporary quality offsets, and penalty time, which can be used in the cell change procedures and which can be adjusted according to the predetermined time pattern. With the control information, the radio resource control of the user equipment 170 may, for example, ask the physical layer of the user equipment 170 to perform certain radio measurements on signals transmitted from the relevant cells. Such signals are transmitted for example via control channels, such as common and paging channels.

In UMTS, the idle states 412 comprise the idle mode 400, and the listed sub-states of the connected mode 402: CELL_FACH (FACH, Forward Access Channel) state 406, CELL_PCH (PCH, Paging Channel) state 408, and URA_PCH (URA, UTRAN Registration Area) state 410.

The connected states 414 comprise a CELL_DCH 404 state (DCH, Dedicated Traffic Channel) representing an active state of the radio resource control, in which a dedicated connection to both transmission directions is allocated to the user equipment 170. This state corresponds to a circuit-switched connection.

In a preferred embodiment of the invention, the user equipment 170 camps on the serving cell 310 in one of the following idle states 412 specified in the 3GPP specifications: idle mode 400, CELL_FACH state 406, URA_PCH state 410, CELL_PCH state 408.

The CELL_FACH state 406 has no dedicated traffic channel (DCH), but data can still be transferred via common channels. This state is particularly suitable for packet-switched connections. The use of common channels preserves the radio resources of the cell. In the uplink direction, small data packets and control signals can be sent on RACH (Random Access Channel) or CPCH (Common Packet Channel). In the downlink direction, FACH (Forward Access Channel) can be used for transmitting control information for controlling the cell change procedures. However, the CELL_FACH state 406 is not a favourable state in terms of power consumption since the user equipment 170 has to monitor control the channels, such as the FACH channel continuously. Consequently, if there is no data transmission activity for a certain time, RRC moves from the CELL-FACH state over to the CELL_PCH 408 state.

The CELL_PCH state 408 is in many respects like the idle mode 400, since the paging channels are monitored by the user equipment 170. The system information and the cell broadcast messages are also received. The difference is that RRC connection still exists logically in the CELL_PCH state. The RRC moves back to the CELL_FACH state if any uplink access is initiated, or if a paging message is received. This is because no up-link activity is possible in the CELL_PCH state.

In the URA_PCH state 410, the paging channels are monitored by the user equipment 170. However, contrary to the CELL_PCH state 408, every cell change does not trigger a cell update procedure, thus reducing signalling activity. Instead, an update procedure is launched only if a UTRAN registration area is changed. A state change to the URA_PCH state is requested by UTRAN if a low activity level of the user equipment 170 is detected. The drawback of this arrangement is that the location of the user equipment 170 is known with poor accuracy, and the paging area has to be expanded from one cell to several cells, possibly to a whole registration area.

As regards the idle mode in the GSM system, the user equipment 170 is not allocated any dedicated channel. In a circuit-switched idle mode, the user equipment 170 listens to the common control channel (CCCH) and the broadcast control channel (BCCH). In packet idle mode, which is only applicable to user equipment supporting GPRS, the user equipment 170 is not allocated any radio resource on a packet data physical channel. However, the packet common control channel (PCCCH) and the packet broadcast control channel (PBCCH) or the CCCH and BCCH channels can be received by the user equipment 170.

Figure 6:
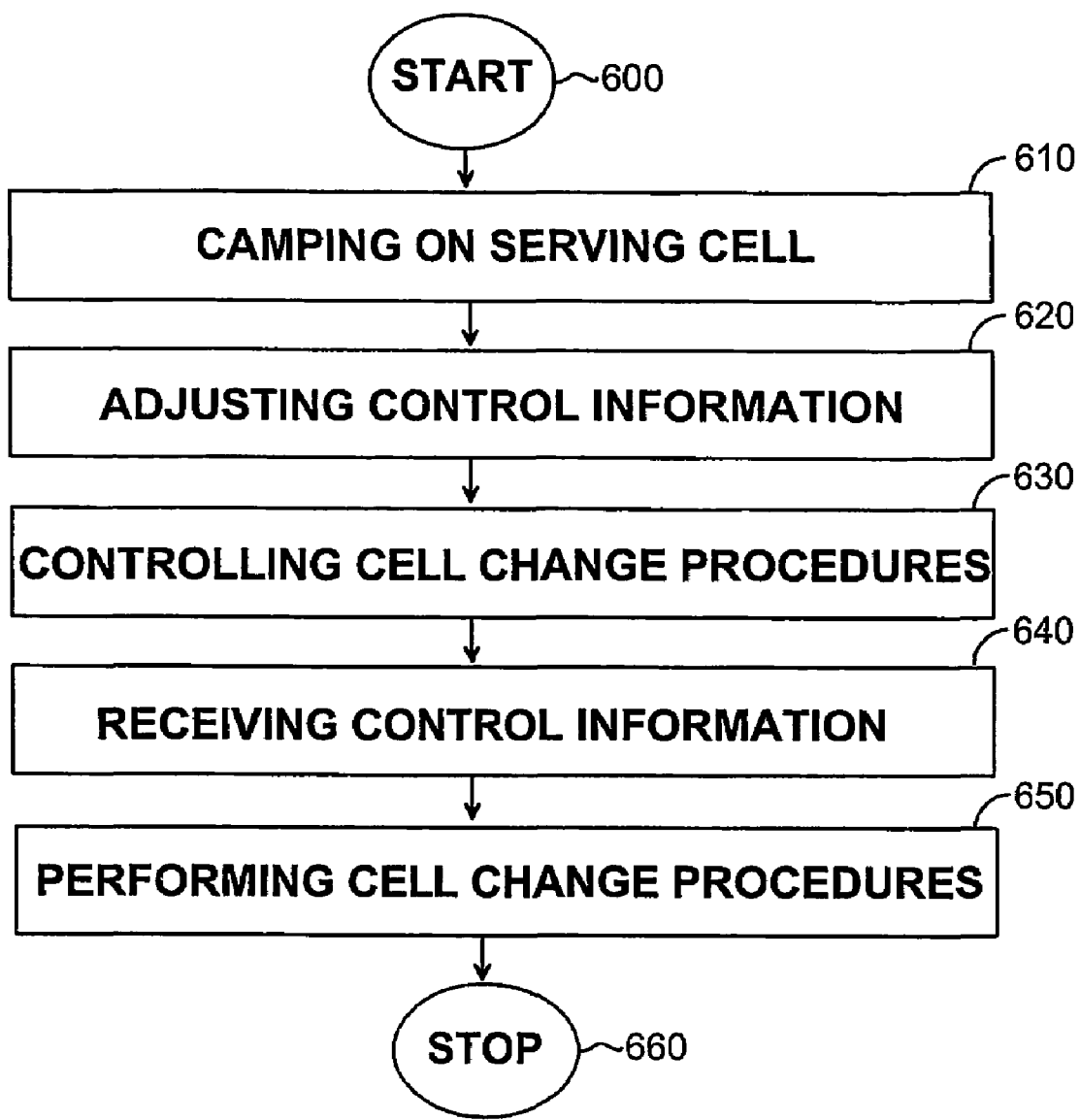
FIG. 6 shows a preferred embodiment of the invention by means of a flow chart.

With reference to the flow chart given in FIG. 6, let us consider the method according to the invention. In start block 600, the radio resource control of the user equipment 170 can be in any state, in which the user equipment 170 can camp on the serving cell 310. In block 610, the user equipment 170 camps on the serving cell 310 in an idle state. In block 620, at least one element of the control information 316 for the cell change procedures is adjusted according to a predetermined time pattern. In block 630, the cell change procedures performed in block 650, are controlled. Before performing the cell change procedures, the adjusted control information 316 is received 640 from the network part 122 by the user equipment 170. In the stop block, the user equipment 170 has finished the cell change procedures, and the radio resource control can be in any state. In Block 660, the method is finished.

Referring to the network elements shown in FIGS. 1 and 3 let us examine the implementation of the method according to the invention. The network part 122 comprises control means, such as the base station controller 314 of the serving base station 312, for controlling the cell change procedures with control information 316. The control information 316 includes at least one element that can be used in controlling a specific step or a function in the cell change procedure.

The network part 122 further comprises adjusting means, such as the base station controller 314, for adjusting at least one element of said control information 316 according to the predetermined time pattern, thus forming adjusted control information 316. In an embodiment of the invention, the adjusting of the control information as well as the controlling of the cell change procedures are implemented in the control unit of the base station controller 314 of the serving base station 312 with software applications. The adjusting means, such as base station controller 314, comprises a calendar and a clock, which are monitored and according to which the control information for controlling the cell change procedures is adjusted. The adjusting can be performed by loading predetermined control information from a memory of the adjusting means.

In a preferred embodiment of the present invention, the adjusting of the control information and the resulting cell change procedures are performed automatically according to the predetermined time pattern. In a preferred embodiment of the invention, the serving cell 310 and the neighbour cell 320 are controlled by different base station controllers.

According to the present invention, the control information for the cell change procedures is adjusted according to a predetermined time pattern. The time pattern comprises time elements which have a characteristic profile in terms of the state of the mobile communication system. For instance, the time element can be a certain time of day, such as day, night, rush hour or a time of a mass event, when the profile of the mobile communication system is known a priori at sufficient accuracy. The duration of a time element may vary from minutes to several days or weeks. A long-term time element may be for instance a holiday season during which the load in urban areas is usually lowered. The profile includes variables, such as an assumed capacity requirement and an assumed cell load, which can be predetermined at a sufficient accuracy for each time element, and according to which the performance of the mobile communication system can be optimised.

In a preferred embodiment of the invention, the time pattern is periodic, and it is repeated. The duration of a period can be 24 hours, for example, and the period may include several time elements, such as day, night and working hours. As a result, the control information for controlling the cell change procedures can be periodic responding to the time element-specific requirements of the mobile communication system.

In a preferred embodiment of the invention, at least one element of the control information 316 is adjusted based on the assumed capacity requirement of the mobile communication system. The capacity requirement for each time element can be determined in the base station controller 314 of the serving cell using procedures known by a person skilled in the art. In an embodiment of the present invention, at least one element of the control information 316 is adjusted based on an assumed cell load of the serving cell 310, which can be measured by the network controller 314 of the serving cell 310 and according to which appropriate user equipment 170 can be subjected to the cell change procedure according to the present invention.

In an embodiment of the invention, at least one element of the control information 316 is adjusted according to an assumed difference in cell load between the serving cell 310 and the neighbour cell 320. In such case, the control information can be adjusted such that the cell load is balanced between the two cells 310, 320.

A time variation in the capacity requirements may be caused by a change in the number of the sets of user equipments 170 in the cell system, a change in the location of the user equipments 170, and a change in the capacity requirement of each user equipment 170. By using the capacity requirement, capacity in the serving cell 310 can be released, for other users by advancing the cell change of the user equipment 170 to another cell.

In a preferred embodiment of the invention, the time elements are monitored and the predetermined control information corresponding to a time element is downloaded and used for controlling the cell change procedures.

In a preferred embodiment of the invention, at least one element of the idle state control information 316 is adjusted. The idle state control information controls the cell change procedures in idle states only.

Figure 7:
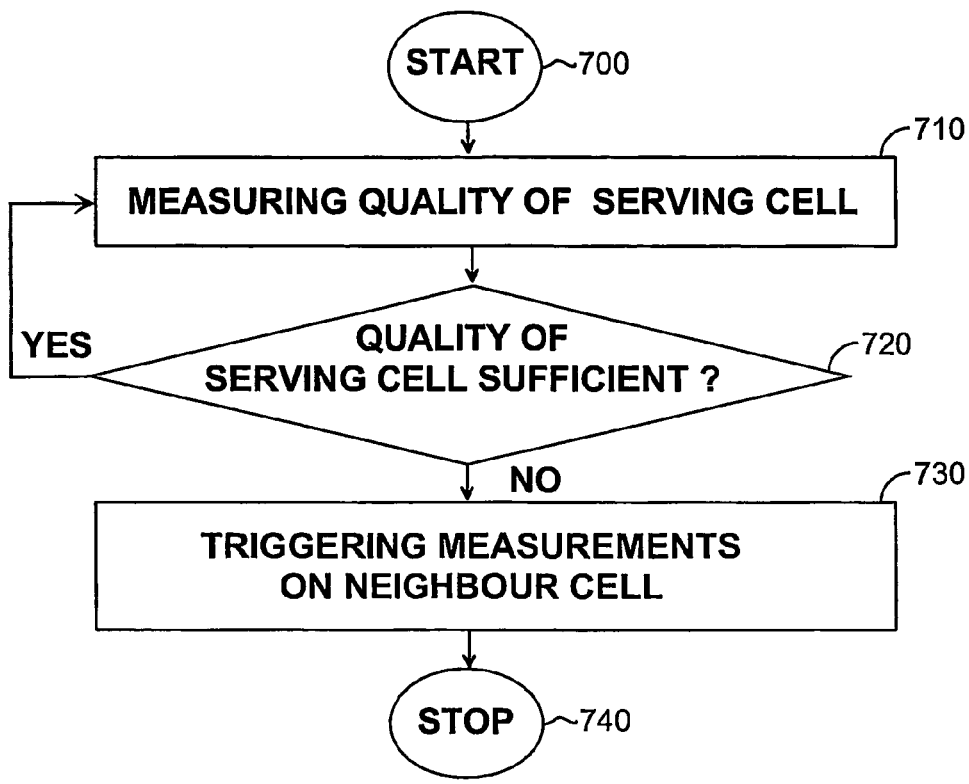
FIG. 7 shows a second preferred embodiment of the invention by means of a flow chart.
Figure 8:
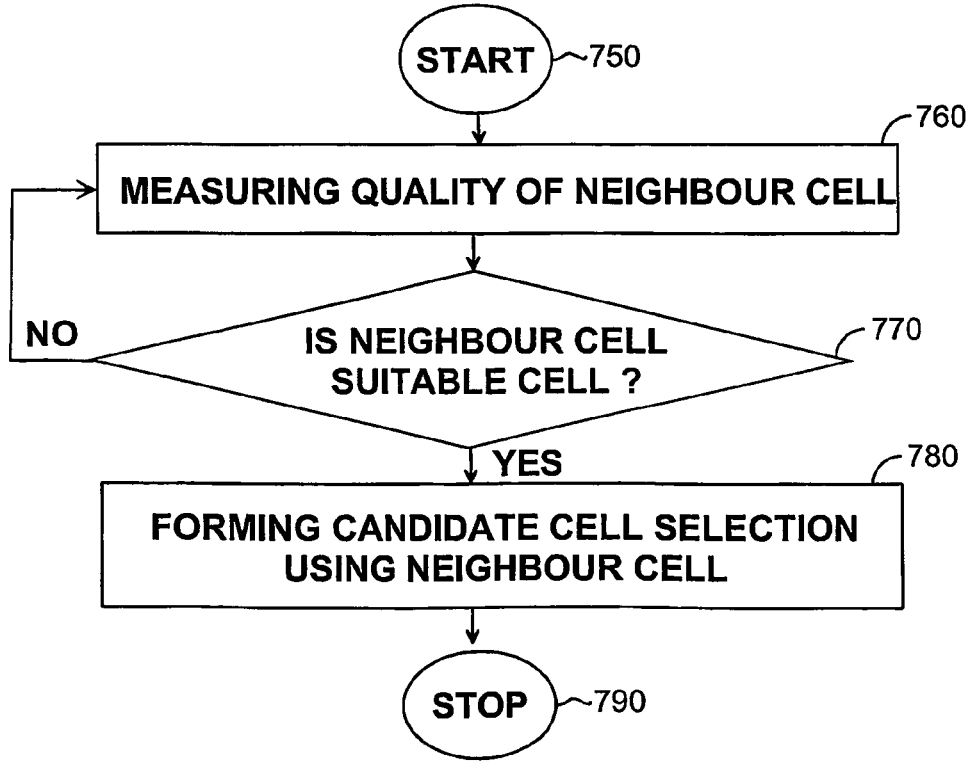
FIG. 8 shows a third preferred embodiment of the invention by means of a flow chart.
Figure 9:
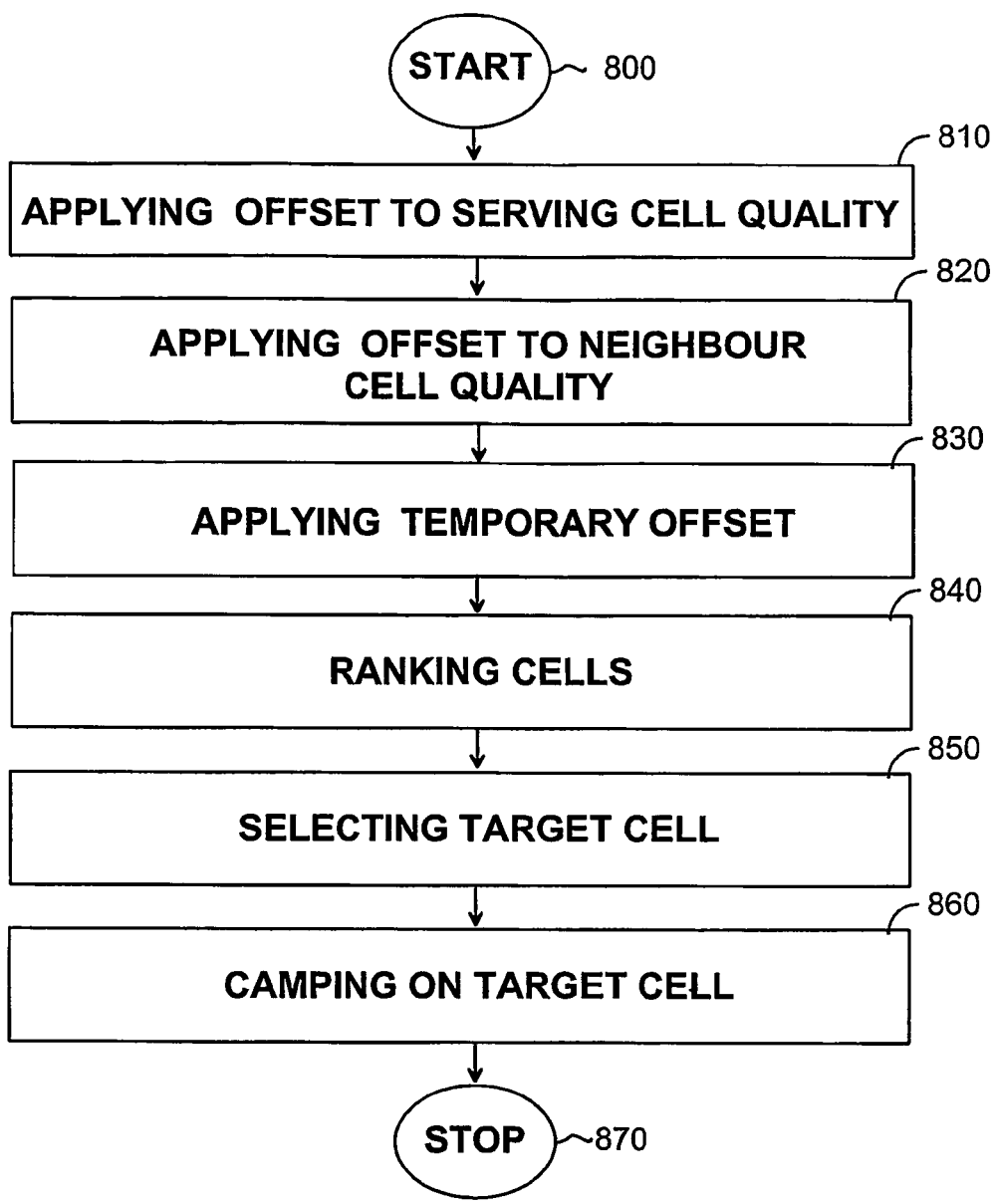
FIG. 9 shows a fourth preferred embodiment of the invention by means of a flow chart.

With reference to FIGS. 7, 8, and 9 let us consider the embodiments of the invention in greater detail. The blocks shown in FIGS. 7, 8, and 9 present preferred embodiments of performing the cell change procedures presented by block 650 in FIG. 6. In a preferred embodiment of the invention, the target cell is selected based on the adjusted control information, and the user equipment 170 camps on the target cell. The target cell can be selected from a group of cells comprising at least one neighbour cell 320 and the serving cell 310. Camping on the target cell can be performed in a similar manner as camping on the serving cell 310.

In a preferred embodiment of the invention, the quality of the serving cell 310 and the quality of at least one neighbour cell 320 are measured by the user equipment 170. Then, the measured cells 310, 320 are ranked based on the measured quality of the serving cell and the measured quality of the neighbour cell 320, and the target cell is selected based on the ranking.

In a preferred embodiment of the invention, at least one quality threshold of the serving cell 310 is adjusted, and the quality of the serving cell 310 is measured. Measurements on the neighbour cell 310 are triggered based on the measured quality of the serving cell 310 and the quality threshold of the serving cell 310, and the target cell is selected based on the triggered measurements.

In a preferred embodiment of the invention, the user equipment 170 camps on the serving cell 310 that uses a different carrier frequency from that used by the neighbour cell 320. Then at least one inter-frequency measurement threshold is adjusted according to the predetermined time pattern. After adjusting, the cell change procedures are performed in the following manner: measuring the quality of the serving cell 310; triggering inter-frequency measurements on the neighbour cell based on the measured quality of the serving cell 310 and the inter-frequency measurement threshold; and selecting the target cell based on the inter-frequency measurement.

In a preferred embodiment of the invention, the user equipment 170 camps on the serving cell 310 that uses a different radio-access technology from that used by the neighbour cell 320. Then the inter-radio access technology measurement threshold is adjusted. After adjusting, the cell change procedures are performed in a following manner: measuring the quality of the serving cell; triggering inter-radio access technology measurements on the neighbour cell based on the measured quality of the serving cell and the inter-radio access technology measurement threshold; and selecting the target cell based on the inter-radio access technology measurement.

In a preferred embodiment of the invention, at least one quality threshold of the neighbour cell 320 is adjusted, and the cell change procedures are performed in the following manner: measuring the quality of the serving cell 310; triggering measurements on the neighbour cell 320 based on the measured quality of the serving cell 310; measuring quality of the neighbour cell 320; forming the candidate cell selection based on the measured quality of the neighbour cell 320 and the quality threshold of the neighbour cell; and selecting the target cell based on the candidate cell selection.

In a preferred embodiment of the invention, at least one quality offset of the serving cell 310 is adjusted; and the cell change procedures are performed in the following manner: measuring the quality of the serving cell 310; applying the quality offset of the serving cell 310 to the measured quality of the serving cell, thus obtaining an offset-applied quality of the serving cell 310; measuring the quality of at least one neighbour cell 320; and selecting the target cell based on the measured quality of the neighbour cell 320, and the offset-applied quality 520 of the serving cell 310.

In a preferred embodiment of the invention, at least one quality offset of the neighbour cell 320 is adjusted, and the cell change procedures are performed in the following manner: measuring the quality of the serving cell 310; measuring the quality of at least one neighbour cell 320; applying the quality offset of the neighbour cell 320 to the measured quality of the neighbour cell 320, thus obtaining an offset-applied quality 550 of the neighbour cell 320; and selecting the target cell based on the measured quality of the serving cell 310 and the offset-applied quality 550 of the neighbour cell 320.

In a preferred embodiment of the invention, at least one temporary quality offset of the neighbour cell 320 and a penalty time of the neighbour cell are adjusted, and the cell change procedures are performed in the following manner: measuring the quality of the serving cell 310; measuring 760 the quality of at least one neighbour cell 320; applying the quality offset of the neighbour cell 320 to the measured quality of the neighbour cell 320 for the duration of the penalty time, thus obtaining a temporary offset-applied quality 564 of the neighbour cell 320; and selecting the target cell based on the measured quality of the serving cell 310 and the temporary offset-applied quality 564 of the neighbour cell 320.

Figure 5:
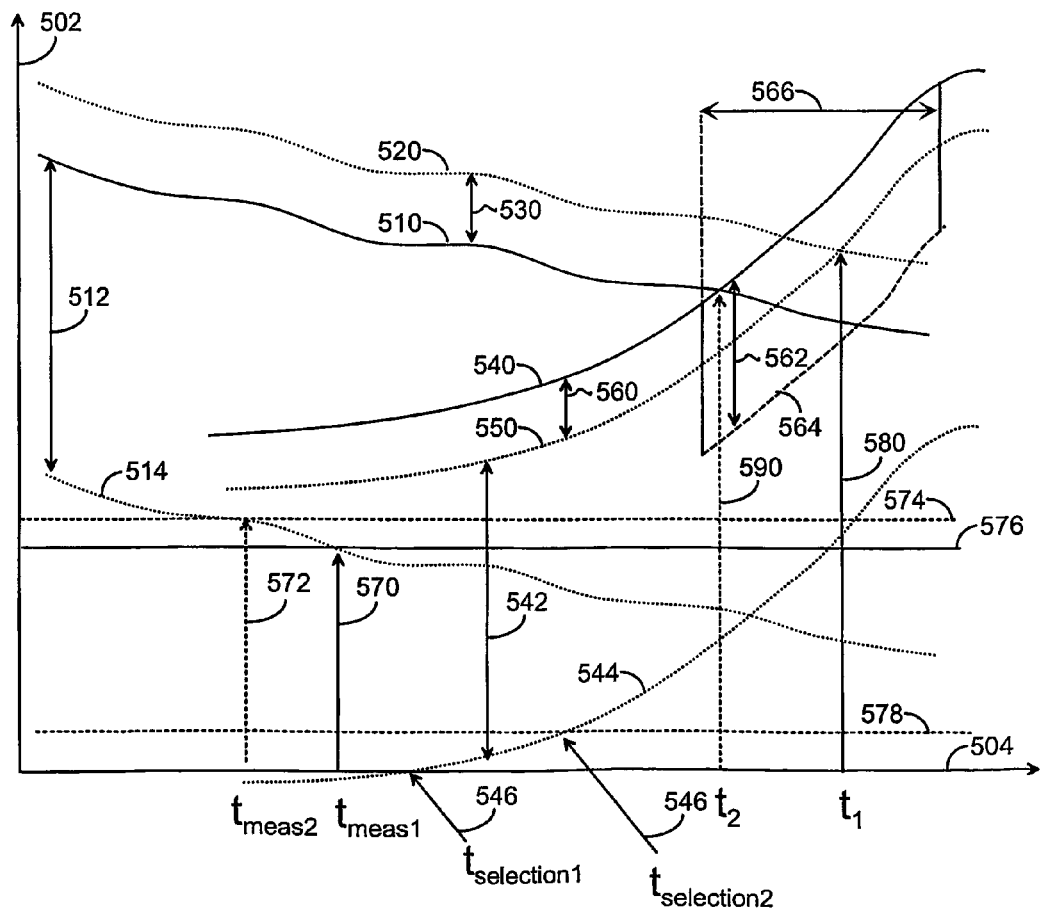
FIG. 5 illustrates embodiments of the invention by means of a graphical representation.

With reference to FIG. 5, let us consider in greater detail examples of embodiments associated with the quality measurements, the quality thresholds, the quality offsets and the penalty time. In FIG. 5, the vertical axis 502 shows the cell quality in dBm units, for instance. The horizontal axis 504 represents a variable, such as time in second units, for instance, which represents the location of the user equipment 170 with respect to the serving cell 310 and the neighbour cell 320. The evolution of the quality of the serving cell 310 and the evolution of the corresponding offset-applied quality are represented by curves 510 and 520, respectively. The gap 530 between curves 510 and 520 represents the offset of the quality of the serving cell 310. Curve 514 represents the scaled quality of the serving cell 310 scaled with a suitable scaling factor 512, such as the minimum required cell quality. The quality threshold 576 of the serving cell 310 is illustrated with vertical line 576.

Let us follow the evolution of the scaled quality 514 of the serving cell 310. When the scaled quality 514 exceeds the threshold 576 of the serving cell 310, at least one measurement on the neighbour cell 320 is triggered at time point $t_{meas1}$ 570. The measurement comprises at least one of the following measurements: intra-frequency, inter-frequency, and inter-radio access measurements. According to an embodiment of the invention, the threshold 576 of the quality of the serving cell 310 is adjusted according to the predetermined time pattern. The adjusted threshold is illustrated with dotted line 574, which is shifted from the previous threshold 576. Now, the measurements are triggered at time point $t_{meas2}$ 572, which is somewhat earlier than the time point $t_{meas1}$ when the adjusting was not done. Correspondingly, by shifting the threshold in another direction, the triggering moment can be delayed.

The evolution of the quality of the neighbour cell 320 and the evolution of the corresponding offset-applied quality are represented by curves 540 and 550, respectively. The gap 560 between curves 540 and 550 represents the offset of the quality of the neighbour cell 320. Curve 544 represents the scaled quality of the neighbour cell 320 scaled with a suitable scaling factor 542, such as the minimum required cell quality. The quality threshold 576 of the neighbour cell 310 is illustrated with vertical line, which in this case coincides with the horizontal axis 504.

Let us suppose that the measurements in the neighbour cell 320 are triggered based on, for example, the quality measurements on the serving cell 310. At time point $t_{selection1}$, the scaled quality 544 of the neighbour cell 320 exceeds the quality threshold 504, and the neighbour cell 320 is selected for the candidate cell selection, from which the target cell is selected. When the quality threshold 504 of the neighbour cell 320 is adjusted to position indicated with line 578, the neighbour cell 320 is selected for the candidate cell selection at time point $t_{selection2}$, which is somewhat shifted from the time point $t_{selection1}$, when the adjusting was not done. In this case, the selection is delayed. However, the selection can be advanced by shifting the threshold 578 to the opposite direction from its original value 504.

Let us consider the evolution of the offset-applied quality 520 of the serving cell 310 and the offset-applied quality 550 of the neighbour cell 320, and especially the cross-section of the two curves 520, 550. In an embodiment of the invention, the target cell is selected when the offset-applied quality 550 of the neighbour cell 310 exceeds the offset-applied quality 520 of the serving cell 320. The corresponding point of time $t_1$ is shown with pointer 580. In an embodiment of the invention, the quality offset 530 of the serving cell 310 and the quality offset 550 of the neighbour cell 320 are adjusted. For simplicity, both quality offsets 530, 550 are removed, and thus the adjusted offset-applied qualities 530, 550 coincide with their corresponding measured quality curves 510, 540. Now, the time point for selecting the target cell is $t_2$ 590, which is advanced from its previous value. As a result, the target cell is selected earlier in respect to a situation when the adjusting was not performed.

In an embodiment of the invention, a temporary quality offset illustrated with indicator 562 is applied to the quality of the neighbour cell 320. The temporary quality offset 562 is applied for the duration of the penalty time 566, which starts, for instance, when the quality of the neighbour cell 320 exceeds a certain threshold. The temporary quality offset 562 can be adjusted according to the predetermined time pattern. The temporary quality offset 562 can be applied, for instance, to control the selection of the candidate cells. Furthermore, the temporary offset 562 can be applied, when the target cell is selected from the candidate cell selection.

For the purpose of the cell change procedures, the user equipment 170 shall be capable of tuning to the neighbour carriers, from which the suitable cell is selected. The neighbour cell 320 may belong to a different frequency band and to a different radio access technology than that used by the serving cell 310. Tuning involves detecting and synchronizing the user equipment 170 to the neighbour carriers, i.e. carriers employed by the neighbour cell 310. The user equipment 170 shall, for example, search all radio frequency channels within its bands of operation, take readings of received radio frequency signal levels on each channel, and calculate the signal levels for each. The common channel carriers can be identified by searching for frequency correction bursts, for example.

The list of carriers to be detected may also be signalled to the user equipment 170 on the broadcast channels, such as common pilot channels and broadcast common channel carrier, and stored in the cell re-selection list of the user equipment 170 for possible later cell re-selection.

In an embodiment of the present invention, the adjusted control information for the cell change procedures is conveyed to the user equipment 170 by means of idle state parameters. The idle state parameters include: the quality threshold and the quality offset of the serving cell 310, the quality threshold and the quality offset of the neighbour cell 320, the temporary quality offset and the penalty time of the neighbour cell 320, and prioritising information.

Let us consider the embodiments of the invention in terms of the 3GPP specification which defines the idle state parameters for UMTS. In the 3GPP specification, the following quantities can be used to represent the cell quality:

a) measured cell Rx level value $Q_{rxmeas}$, which represents the received signal code power (RSCP) in UTRAN and GSM carrier received signal strength indicator (RSSI) in GSM. RSCP is determined from the primary common pilot channel (P-CPICH) ( ) in frequency division duplex (FDD) cells, and from the primary common control physical channel (P-PCICH) in the time division duplex (TDD) cells. RSSI, respectively, is determined from the GSM broadcast control channel carrier.

b) measured cell quality value $Q_{meas}$ is calculated from the received energy per chip divided by the power density in the band (Ec/No) quantity. Ec/No measurement is performed on the primary common control channel.

Furthermore, the following quantities can be used to represent the scaling factors 512 and 542 in UMTS:

a) minimum required Rx level in the cell, indicated by symbol $Q_{rxlevmin}$ b) minimum required quality level in the cell, indicated by $Q_{qualmin}$ c) a compensation factor. It can be defined as a difference between the maximum power level that the user equipment 170 uses when accessing the cell in random access channel (RACH) and the maximum output power of the user equipment 170. The compensation factor is indicated with $P_{comp}$, and its value is always greater than or equal to zero.

The measured qualities and the scaling factors define the following scaled qualities:

scaled Rx quality $$S_{rxlev} = Q_{rxmeas} - Q_{rxlevmin} - P_{comp}; \text{ and} \quad (1)$$

scaled quality $$S_{qual} = Q_{meas} - Q_{qualmin}. \quad (2)$$

The quality threshold 576 illustrated in FIG. 5 can represent the following quality thresholds specified in the 3GPP specification: threshold $Ss_{earchHCS}$ is used to control measurement for cell re-selection when the hierarchical cell structure is used. It specifies the limit for $S_{rxlev}$ in the serving cell 310, below which the user equipment 170 shall initiate measurements of all neighbour cells 320; threshold $S_{HCS,RATm}$ is used to control measurement for cell re-selection when a hierarchical cell structure is used. It specifies the radio access technology-specific threshold in the serving cell 310; parameter $S_{intrasearch}$ specifies the threshold for intra-frequency measurements and for the hierarchical cell structure measurement rules; parameter $S_{intersearch}$ specifies the threshold for inter-frequency measurements and for the hierarchical cell structure measurement rules; and parameter $S_{limit,SearchRATm}$ is used in the measurement rules for cell re-selection when a hierarchical cell structure is used. It specifies the radio access technology-specific threshold in the serving UTRA cell, above which the user equipment 170 need not perform any inter-radio access technology measurements. The measurement rules are specified in the 3GPP specification.

The measurement rules listed above can be written in terms of mathematical notation. In the following, the symbol $S_x$ represents the scaled quality 514 of the serving cell 310, i.e. $S_{qual}$ for FDD cells, and $S_{rxlev}$ for TDD and GSM cells.

When a non-hierarchical cell structure is used, the intra-frequency measurements are triggered when, $$S_{intrasearch} < S_x \leq S_{intersearch}. \quad (3)$$

The intra- and inter-frequency measurements are triggered when $$Ss_{earchRAT} < S_x \leq S_{intersearch}, \quad (4)$$

and the inter-radio access technology measurements are triggered when:

$$S_x \leq S_{searchRAT}. \quad (5)$$

No measurements are initiated when $$S_x > S_{intrasearch}. \quad (6)$$

When a hierarchical cell structure is used, the intra- and inter-frequency measurements are initiated on cells with a higher priority than the serving cell 310 when $$Sx > S_{intrasearch}. \quad (7)$$

The intra- and inter-frequency measurements are triggered on cells with a higher or equal priority with the serving cell 310 when $$S_x = S_{intersearch} > S_{intersearch}. \quad (8)$$

All intra-, inter-, and inter-frequency measurements are initiated when $$S_x = S_{intrasearch} \quad (9)$$

or $$S_{rxlev} = S_{searchHCS}. \quad (10)$$

The inter-radio access technology measurements are triggered on cells with a higher or equal priority when $$S_{HCS,RATm} < S_x \leq S_{limit,SearchRATm}.$$

All the inter-radio access technology measurements are triggered when:

$$S_{rxlev} < S_{HCS,RATm} \quad (11)$$

or $$S_{qual} < S_{SearchRATm}; \quad (12)$$

However, the inter-radio access technology measurements are not carried out if $$S_{qual} > S_{limit,searchRATm}. \quad (13)$$

The cell change procedures are carried out if conditions (3)-(13) are fulfilled, and the measurements indicated by the measurement results and the system information can be initiated.

In TDD cells of UTRAN and the GSM cells, the cell is selected to the candidate cell selection when $$S_{rxlev} > 0. \quad (14)$$

In FDD cells of UTRAN, the cell is selected to the candidate cell selection when $$S_{rxlev} > 0 \text{ and} \quad (15)$$

$$S_{qual} > 0 \quad (16)$$

simultaneously. In the 3GPP specification, the criteria (14) and (16) are also called the S-criteria. The parameters $S_{rxlev}$ and $S_{qual}$ are defined by Equations (1) and (2) with the exception that the Ec/Ior (the received energy per chip divided by the total interference the band) is used instead of CPICH Ec/No in the definition of $S_{qual}$.

Forming the candidate cell selection is followed by a cell reselection where the target cell is chosen from the candidate cell selection including the serving cell 310 by means of relative offsets. When the quality offsets are accounted for, the offset-applied quality parameters can be defined as $$R_s = Q_{meas,s} + Q_{hyst}, \quad (17)$$

$$R_n = Qm_{eas,n} - Q_{offset,n}, \quad (18)$$

wherein $Q_{meas,s}$ and $Q_{meas,n}$ are the measured cell quality of the serving cell 310 and the neighbor cell 320, respectively. The parameter $Q_{hyst}$ is a quality offset of the serving cell 310 and $Q_{offset}$ is a quality offset of the neighbour cell 320. The values of the offset parameters $Q_{hyst}$ and $Q_{offset}$ are set in the network part (122) and can be broadcast to the user equipment 170 in system information, for example.

With further reference to FIG. 5, let us consider an example of a cell change process based on using the cell quality parameters given in Equations (17) and (18). This case represents a situation, where the serving cell 310 and the neighbour cell 320 belong to different radio access technologies, i.e. the cells 310, 320 may use different carrier frequencies and signal coding. The threshold $Ss_{earchRAT}$ for inter-radio access technology measurements is shown with vertical line 576. The evolution of the quality $Q_{meas,s}$ of the serving cell 310 and the corresponding offset-applied quality $R_s$ are represented by curves 510 and 520, respectively. The gap 530 between curves 510 and 520 represents the quality offset $Q_{hyst}$ of the serving cell. Curve 514 represents the scaled cell quality $S_{qual,s}$ of the serving cell 310 defined in Equation (2). The gap 512 represents the minimum required cell quality $Q_{qualmin}$ used in Equation (2).

When the cell quality criteria $S_{qual}$ exceeds the threshold $S_{interseacrh}$ 576, the intra-frequency, inter-frequency, and inter-radio access measurements on the neighbour cell 310 are triggered.

The evolution of the quality of the neighbour cell 320 $Q_{meas,n}$ is represented by curve 540 whereas the calculated quality parameter $R_s$ is represented by curve 550. The gap 560 between curves 540 and 550 shows the offset $Q_{offset}$. The cell quality criteria of the neighbour cell $S_{qual,n}$ is represented by curve 544. When the cell quality criteria of the neighbour cell $S_{qual,n}$ exceeds zero value at time point $t_{selection}$ 546, the neighbour cell is accepted to the candidate cell selection.

Let us consider the evolution of the offset-applied qualities of the serving cell 310 and of the neighbour cell 320 represented by curves 520 and 550, respectively. The cell re-selection to the neighbour cell 320 takes place when the offset-applied quality Rn of the neighbour cell 310 exceeds the offset-applied quality $R_s$ of the serving cell 320, i.e. the $R_s$ and $R_n$ parameters obey relationship $R_n > R_s$.

Let us consider embodiments of the invention, in which a hierarchical cell structure 200 shown in FIG. 2 is used. In an embodiment, the user equipment 170 camps on the serving cell 310 belonging to the same hierarchical cell structure 200 as the neighbour cell 320. Then the prioritising information of the hierarchical cell structure 200 is adjusted, and the cells 210 to 270 of the hierarchical cell structure 200 are re-prioritised using the adjusted prioritising information. Then the cell change procedures are performed based on the re-prioritising information. In an embodiment, the cells 210 to 270 in the hierarchical cell structure 200 are re-prioritised with equal priorities, and the selection of the target cell can be performed in the same manner as it is carried out in a non-hierarchical cell structure.

With reference to FIGS. 7, 8, and 9 let us consider preferred embodiments of the invention by using a flow chart representation. In the start block 700 of FIG. 7, the control information for cell change procedures has been received. In block 710, the measurements on the quality of the serving cell 310 are carried out. In block 720, the measured quality of the serving cell 310 is compared with the corresponding threshold, and accordingly, the measurements on the neighbour cell 320 are triggered in block 730. In stop block 740, the measurement on the neighbour cell 320 can be initiated.

In the start block 750 of FIG. 8, the measurements on the neighbour cell 320 have been triggered. In block 760, the measurements on the neighbour cell 310 are performed. In block 770, the measured quality of the neighbour cell 320 is compared with the threshold, and accordingly, the neighbour cell 310 is selected to the candidate cell selection in block 780. In stop block 790, the target cell can be selected.

In the start block 800 of FIG. 9, the measurements on the serving cell 310 and the neighbour cell have been started. In block 810, the quality offset 530 of the serving cell 310 is applied to the quality 510 of the serving cell 310. In block 820, the quality offset 560 of the neighbour cell 320 is applied to the quality 540 of the neighbour cell 320. In block 830, the temporary offset 562 is applied to the quality 540 of the neighbour cell 320. The order of blocks is 810, 820, and 830 can be varied, since the measurements and the applying of the offsets can be implemented independently. In block 840, the cells are ranked. In block 850, the target cell is selected and in block 860, the user equipment camps on the target cell. In Block 870, the method is finished. According to the invention, the control information controlling the steps described above can be adjusted according to the predetermined time pattern.

Figure 10:
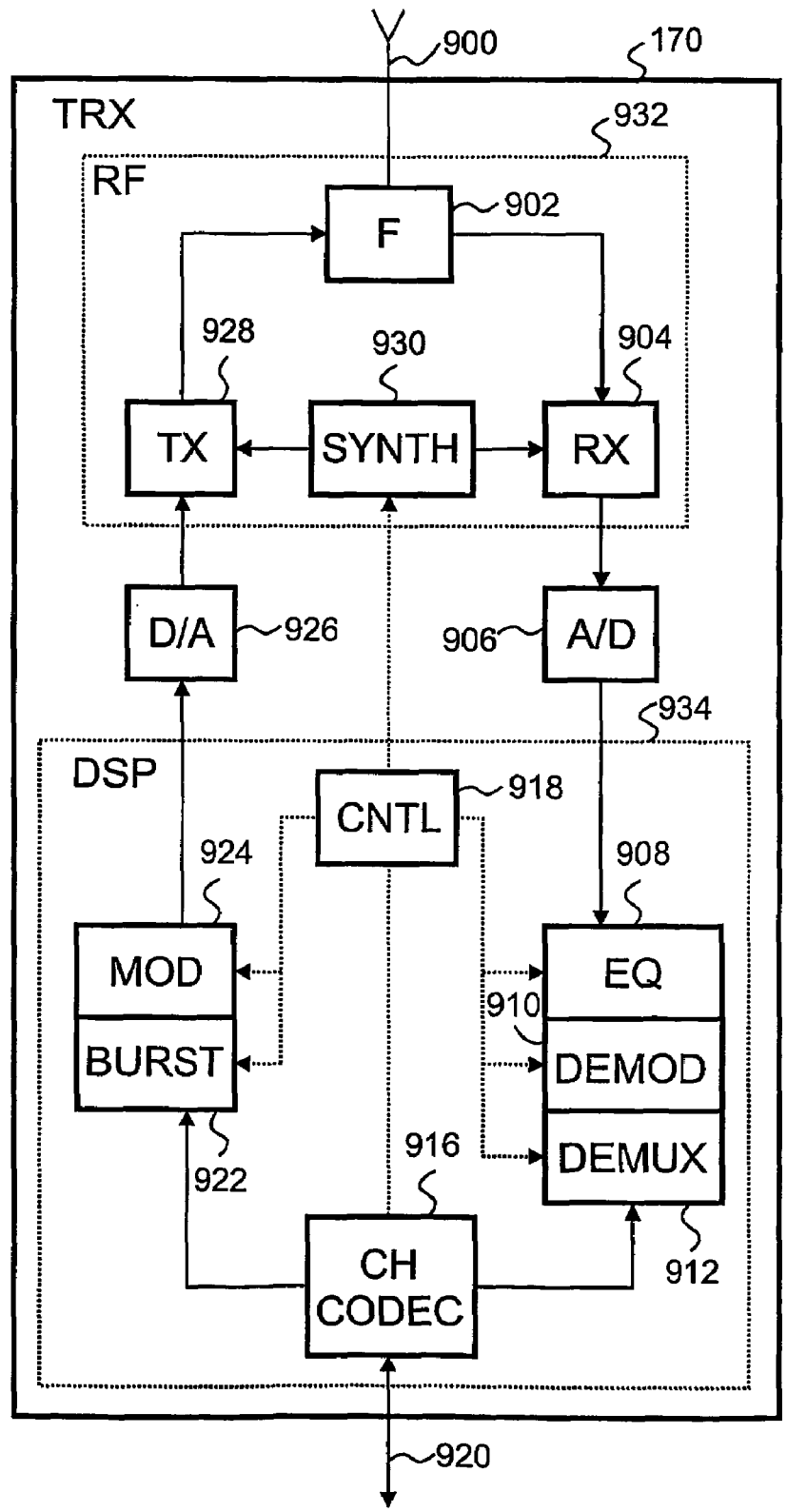
FIG. 10 shows an example of a structure of user equipment.

FIG. 10 illustrates the structure of a user equipment 170 in such mobile communication system to which the solution according to preferred embodiments can be applied. The user equipment 170 comprises an antenna 900 for signal transmission and reception. The signal is taken from the antenna 900 to a duplex filter 902, which separates the signals of the transmission and reception directions from each other. A receiver 904 comprises a filter, not shown in FIG. 10, which eliminates the frequencies outside the desired frequency band. Then, the signal is converted into an intermediate frequency or directly to base-band, and the resulting signal is sampled and quantified in an analogue/digital converter 906. An equalizer 908 compensates for interference, for instance the interference caused by multi-path propagation. A demodulator 910 takes a bit stream from the equalized signal, which bit stream is transmitted to a demultiplexer 912. The demultiplexer 912 separates the bit stream into separate logical channels. A channel decodec 916 decodes the bit stream of different logical channels, i.e. decides whether the bit stream is signalling information to be further transmitted to a control unit 918, or whether the bit stream is speech to be further transmitted 920 to a speech codec (not shown). The channel codec 916 also performs error correction. The control unit 918 performs internal control tasks by controlling different units. A burst generator 922 adds a training sequence and tail bits to the data arriving from the channel codec 916. A modulator 924 modulates the digital signals to a radio-frequency carrier wave. The nature of this function is analogue, so performing it requires digital/analogue converters 926. A transmitter 928 comprises a filter with which the bandwidth is reduced. In addition, the transmitter 928 controls the output power of the transmission. A synthesizer 930 arranges all required frequencies to different units. The clock contained in the synthesizer 930 can be locally controlled. The synthesizer 930 creates the required frequencies, for example by means of a voltage-controlled oscillator.

In the way illustrated by FIG. 7, the structure of the transceiver can be further divided into radio frequency parts 932 and a digital signal processor with software 934. The radio frequency parts 932 comprises a receiver 904, a transmitter 928 and a synthesizer 930. The digital signal processor with software 934 comprise an equalizer 908, a demodulator 910, a demultiplexer 912, a channel codec 916, a control unit 918, a burst generator 922 and a modulator 924. An analogue/digital converter 906 is required for converting an analogue radio signal into a digital one, and correspondingly, a digital/analogue converter 926 is required for converting a digital signal into an analogue one.

The user equipment 170 is configured to be in connection with more than one radio system. Typically, this requires that the radio frequency parts be capable of generating the required frequencies, which may be different in different systems, and that the digital part of the equipment be capable of coding and de-coding the possibly different signal forms of different systems.

Further, the equipment may comprise user interface parts, such as a display, a keyboard, an earpiece and a microphone. These are not, however, shown in the figure. The control unit 918 of the equipment is typically implemented with a microprocessor or with separate logic circuits with memory elements, and with required software.

The user equipment 170 comprises receiving means 900, 932, 934 for receiving signals from the serving base station 320 and from the neighbour base station 322. Furthermore, the user equipment 170 comprises cell change procedure means 934 for performing cell change procedures based on control information 316 received from the network part 122. The cell change procedures can be implemented in the control unit 918 with suitable software.

In a preferred embodiment of the invention, the cell change procedures can be controlled so that the probability of a cell change is lowered while the user equipment 170 is in a dedicated connection thus reducing measurements carried out by the user equipment 170 and signalling between the user equipment 170 and the serving base station 310, and increasing the overall capacity of the mobile communication system, especially in interference-limited radio systems. Especially, the call establishment success probability for high bit rate services due to enhanced cell re-selection to a cell with a better signal quality is increased. Furthermore, the embodiments of the invention enable reduced transmission power of both the serving base station 312 and user equipment 170, thus saving battery consumption of the user equipment 170, and increasing capacity in multi-user interference-limited networks.

Even though the invention is described above with reference to an example according to the accompanying drawings, it is clear that the invention is not restricted thereto but can be modified in several ways within the scope of the appended claims.

The invention claimed is:

1. A method, comprising:
   camping, in an idle state, on a serving cell formed by a serving base station;
   adjusting, in a network element of a mobile communication system, at least one element of control information according to a predetermined time pattern comprising time elements having a characteristic profile in terms of a state of the mobile communication system, to form adjusted control information, wherein the control information controls cell change procedures of a user equipment camping in the idle state on the serving cell;
   receiving, in the user equipment, the adjusted control information for controlling cell change procedures of the user equipment, said cell change being conducted from the serving cell to a target cell; and
   performing, in the user equipment, the cell change procedures based on the received control information; and
   controlling the cell change procedures based on said adjusted control information, wherein at least one neighbor cell is formed by a neighbor base station, and the user equipment is configured to receive signals from said serving base station and said neighbor base stations.

2. A system, comprising:
   a network part configured to provide the fixed infrastructure of the mobile communication system,
   the network part comprising a serving base station configured to form a serving cell, and a neighbour base station configured to form a neighbour cell;
   a user equipment comprising a receiver configured to receive signals from the serving base station and from the neighbour base station;
   the network part further comprises a controller configured to control cell change procedures with control information, said cell change being conducted from the serving cell to a target cell,
   the user equipment further comprising a cell changer configured to perform cell change procedures based on control information received from the network part,
   wherein the receiver and the cell changer are configured to camp on the serving cell in an idle state, and
   wherein the network part further comprises an adjuster configured to adjust at least one element of said control information according to a predetermined time pattern comprising time elements having a characteristic profile in terms of a state of the mobile communication system, to form adjusted control information.

3. The system of claim 2, wherein the cell changer is configured to select the target cell based on the adjusted control information, and
   wherein the receiver and the cell changer are configured to camp on the target cell.

4. The system of claim 2, wherein the receiver and the cell changer are configured to measure a quality of the serving cell based on the adjusted control information,
   wherein the receiver and the cell changer are configured to measure a quality of at least one neighbour cell based on the adjusted control information,
   wherein the cell changer is configured to rank the measured cells based on the measured quality of the serving cell, the measured quality of the neighbour cell, and the adjusted control information, and
   wherein the changer is configured to select the target cell based on the ranking.

5. The mobile communication system of claim 2, wherein the network part comprises separate base station controllers for the serving base station and neighbour base station.

6. A network element of a mobile communication system, comprising a serving base station configured to form a serving cell, a neighbour base station configured to form a neighbour cell, and a user equipment camped on the serving cell in an idle state and comprising a receiver configured to receive signals from the serving base station and from the neighbor base station, the user equipment further comprising a cell changer configured to perform cell change procedures based on control information, and a controller configured to control cell change procedures with control information, said cell change being conducted from the serving cell to a target cell, the network element comprising:
   an adjuster configured to adjust at least one element of said control information according to a predetermined time pattern comprising time elements having a characteristic profile in terms of a state of the mobile communication system, to form adjusted control information.

7. A method, comprising:
   providing, in a network element of a mobile communication system, control information controlling cell change procedures of a user equipment camping in an idle state on a serving cell formed by a base station;
   adjusting at least one element of said control information according to a predetermined time pattern comprising time elements having a characteristic profile in terms of a state of the mobile communication system, to form adjusted control information;
   transmitting the adjusted control information to the user equipment; and controlling the cell change procedures based on the adjusted control information.

8. The method of claim 7, further comprising:
performing, in the user equipment. the cell change procedures based on the received control information; and
adjusting at least one element of the idle state control information.

9. The method of claim 7, wherein performing the cell change procedures comprises:
selecting the target cell based on the adjusted control information; and
camping on the target cell.

10. The method of claim 7, wherein performing the cell change procedures comprises:
measuring the quality of the serving cell;
measuring the quality of at least one neighbour cell;
ranking the measured cells based on the measured quality of the serving cell and the measured quality of the neighbour cell; and
selecting the target cell based on the ranking.

11. The method of claim 7, further comprising:
adjusting at least one quality threshold of the serving cell, and
wherein performing the cell change procedures comprises:
measuring the quality of the serving cell,
triggering measurements on the neighbour cell based on the measured quality of the serving cell and the quality threshold of the serving cell, and
selecting the target cell based on the triggered measurements.

12. The method of claim 7, further comprising:
camping on the serving cell that uses a different carrier frequency from that used by the neighbour cell; and
adjusting at least one inter-frequency measurement threshold, and
wherein performing the cell change procedures comprises:
measuring the quality of the serving cell,
triggering inter-frequency measurements on the neighbour cell based on the measured quality of the serving cell and the inter-frequency measurement threshold, and
selecting the target cell based on the inter-frequency measurement.

13. The method of claim 7, further comprising:
camping on the serving cell that uses a different radio-access technology from that used by the neighbour cell;
adjusting an inter-radio access technology measurement threshold, and
wherein performing the cell change procedures comprises:
measuring the quality of the serving cell,
triggering inter-radio access technology measurements on the neighbour cell based on the measured quality of the serving cell and the inter-radio access technology measurement threshold; and
selecting the target cell based on the inter-radio access technology measurement.

14. The method of claim 7, further comprising:
adjusting at least one quality threshold of the neighbour cell, and
wherein the performing, in the user equipment, of the cell change procedures comprises,
measuring the quality of the serving cell,
triggering measurements on the neighbour cell based on the measured quality of the serving cell,
measuring the quality of the neighbour cell,
forming the candidate cell selection based on the measured quality of the neighbour cell and the quality threshold of the neighbour cell, and
selecting the target cell based on the candidate cell selection.

15. The method of claim 7, further comprising:
adjusting at least one quality offset of the serving cell, and
wherein the performing, in the user equipment, of the cell change procedures comprises:
measuring the quality of the serving cell,
applying the quality offset of the serving cell to the measured quality of the serving cell, thus obtaining an offset-applied quality of the serving cell,
measuring the quality of at least one neighbour cell, and
selecting the target cell based on the measured quality of the neighbour cell, and the offset-applied quality of the serving cell.

16. The method of claim 7, further comprising:
adjusting at least one quality offset of the neighbour cell, and
wherein the performing, in the user equipment, of the cell change procedures comprises:
measuring the quality of the serving cell,
measuring the quality of at least one neighbour cell,
applying the quality offset of the neighbour cell to the measured quality of the neighbour cell, thus obtaining an offset-applied quality of the neighbour cell, and
selecting the target cell based on the measured quality of the serving cell and the offset-applied quality of the neighbour cell.

17. The method of claim 7, further comprising:
adjusting at least one temporary quality offset of the neighbour cell and a penalty time of the neighbour cell, and
wherein the performing, in the user equipment, of the cell change procedures comprises:
measuring the quality of the serving cell,
measuring quality of at least one neighbour cell,
applying the quality offset of the neighbour cell to the measured quality of the neighbour cell for the duration of the penalty time, thus obtaining a temporary offset-applied quality of the neighbour cell, and
selecting the target cell based on the measured quality of the serving cell and the temporary offset-applied quality of the neighbour cell.

18. The method of claim 7, further comprising:
adjusting at least one element of the control information to assumed capacity requirements of the mobile communication system.

19. The method of claim 7, further comprising:
adjusting at least one element of the control information based on assumed cell load of the serving cell.

20. The method of claim 7, further comprising:
camping, on the serving cell belonging to the same hierarchical cell structure as the neighbour cell;
adjusting prioritising information of hierarchical cell structure;
re-prioritising the cells in a hierarchical cell structure using the adjusted prioritising information; and
performing the cell change procedures based on the re-prioritising information.

21. The method of claim 7, further comprising:
camping in one of the idle states specified in third generation partnership project specifications, including idle mode, a cell forward access channel state, a user registration area paging channel state, a cell paging channel state.

22. The method of claim 7, further comprising:
camping on the serving cell controlled by a base station controller different from the base station controller controlling the neighbour cell.

23. An apparatus, comprising:
a controller configured to provide control information controlling cell change procedures of a user equipment camping in an idle state on a serving cell formed by a base station; and
an adjuster configured to adjust at least one element of said control information according to a predetermined time pattern comprising time elements having a characteristic profile in terms of a state of the mobile communication system, to form adjusted control information,
wherein the controller is further configured to transmit the adjusted control information to the user equipment and control the cell change procedures based on the adjusted control information.

24. The apparatus of claim 23, wherein the adjuster is configured to adjust at least one element of the idle state control information.

25. The apparatus of claim 23, wherein the adjuster is configured to adjust at least one quality threshold of the serving cell.

26. The system of claim 23,
wherein the adjuster is configured to adjust at least one inter-frequency measurement threshold.

27. The apparatus of claim 23,
wherein the adjuster is configured to adjust at least one inter-radio access technology measurement threshold.

28. The apparatus of claim 23, wherein the adjuster is configured to adjust at least one quality threshold of the neighbour cell.

29. The apparatus of claim 23, wherein the adjuster is configured to adjust at least one quality offset of the serving cell.

30. The apparatus of claim 23, wherein the adjuster is configured to adjust at least one quality offset of the neighbour cell.

31. The apparatus of claim 23, wherein the adjuster is configured to adjust at least one temporary quality offset of the cell and a penalty time of the neighbour cell.

32. The apparatus of claim 23, wherein the adjuster is configured to adjust at least one element of the control information to assumed capacity requirements of the mobile communication system.

33. The apparatus of claim 23, wherein the adjuster is configured to adjust at least one element of the control information based on an assumed cell load in the serving cell.

34. The system of claim 23, wherein the base station and a neighbour base station are configured to form a hierarchical cell structure such that the serving cell and a neighbour cell belong to the same hierarchical cell structure,
wherein the adjuster is configured to adjust prioritising information, and
wherein the controller is configured to re-prioritise the serving cell and the neighbour cell based on the adjusted prioritising information.

35. An apparatus, comprising:
providing means for providing control information controlling cell change procedures of a user equipment camping in an idle state on a serving cell formed by a base station;
adjusting means for adjusting at least one element of said control information according to a predetermined time pattern comprising time elements having a characteristic profile in terms of a state of the mobile communication system, to form adjusted control information;
transmitting means for transmitting the adjusted control information to the user equipment; and
controlling means for controlling the cell change procedures based on the adjusted control information.

36. The apparatus according to claim 35, wherein the adjusting means adjusts at least one element of the idle state control information.

37. The apparatus according to claim 35, wherein the adjusting means adjusts at least one quality threshold of the serving cell.

38. A computer-readable program distribution medium encoding a computer program of instructions being configured to control a processor to perform:
providing, in a network element of a mobile communication system, control information controlling cell change procedures of a user equipment camping in an idle state on a serving cell formed by a base station;
adjusting at least one element of said control information according to a predetermined time pattern comprising time elements having a characteristic profile in terms of a state of the mobile communication system, to form adjusted control information;
transmitting the adjusted control information to the user equipment; and
controlling the cell change procedures based on the adjusted control information.

39. The apparatus according to claim 38, further comprising:
adjusting at least one element of the idle state control information.

40. The apparatus according to claim 38, further comprising:
adjusting at least one quality threshold of the serving cell.

41. The apparatus according to claim 23, further comprising:
a receiver and a cell changer configured to measure a quality of the serving cell.

42. The apparatus according to claim 41, wherein the cell charger is configured to select a target cell based on a triggered measurements.

* * * * *